Jan. 8, 1929.

L. O. FRENCH 1,697,953

ELECTROMAGNETIC VALVE

Filed Jan. 10, 1927

INVENTOR.

Louis O. French

Patented Jan. 8, 1929.

1,697,953

UNITED STATES PATENT OFFICE.

LOUIS O. FRENCH, OF MILWAUKEE, WISCONSIN.

ELECTROMAGNETIC VALVE.

Application filed January 10, 1927. Serial No. 160,178.

The invention relates to electromagnetically-operated valves, and more particularly to an electromagnetic valve suitable for use as a fuel-metering valve in the feul-feeding or fuel-injection systems of internal combustion engines to control directly or indirectly the amount of fuel supplied to the engine.

The object of the present invention is to provide an efficient and simple means for accurately controlling the lift of the electromagnetic valve by stop means engageable with the armature on the valve while the valve is in assembled position, and more particularly to provide a control operable from the exterior of the device so that the valve may be adjusted while in operation. The invention is shown as incorporated in the valve structure of my copending application Serial No. 111,775, filed May 26, 1926, now Patent No. 1,664,616, issued April 3, 1928 wherein certain features of construction are more particularly described and claimed.

The invention further consists in the several features hereinafter set forth and more particularly defined by claims at the conclusion hereof.

In the drawings Fig. 1 is a vertical sectional view of a valve embodying the invention;

Figure 1:
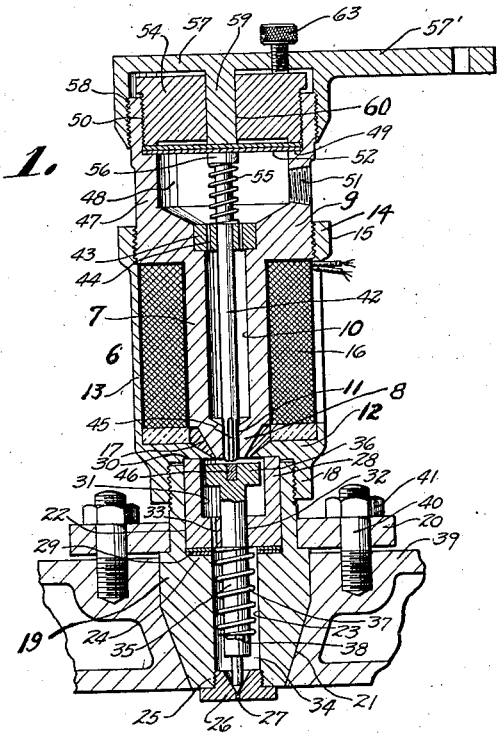

In the drawings the numeral 6 designates the electromagnet which has a centrally disposed core 7 with a conically tapered inner pole 8 at one end, a threaded flange 9, a central fuel passage or bore 10, and a small bore 11 communicating with said passage 10. An outer pole member 12 surrounds the inner pole and is formed integral with or connected to a return magnetic flux path portion 13 having a ring portion 14 provided with a threaded bore 15 to receive the threads of the flange 9. A suitably insulated energizing coil 16 surrounds the core between the outer pole and the flange 9.

A sealing gasket 17 of non-magnetic material is interposed between the tapered end of the core and the tapered end of the outer pole and is clamped thereto in a fluid-tight manner by pressure exerted through the core and its threaded connection with the portion 14, thus providing a fluid-tight pole face.

A threaded tubular portion 18 is associated with the outer pole and receives and is engaged by the upper threaded end of a clamping member 19 which has a shoulder against which a plate 20 abuts, a conical lower end 21 and centrally disposed alined bores 22 and 23 forming a shoulder 24 and a threaded bore 25 in which the valve seat member 26 is mounted.

Where the valve is used as a fuel injector the passage 27 in the member 26 forms the fuel discharge orifice though it will be understood that the features of construction described herein are not to be limited to use only as fuel injectors.

A casing member 28 is mounted in the bore 22 of the member 19 and seats at its lower end against the shoulder 24 or against the upper one of a series of shims or washers 29 interposed between said member and shoulder and at its upper end against the lower side of the outer pole within an annular centering recess 30 formed therein and these seating faces are tightly clamped together by the clamping member 19 exerting pressure thereon through the flange or shoulder 24.

The casing member 28 has alined bores 31 and 32 and a passage 33 connecting the bore 31 with the space 34 provided by the bore 23 of the member 19. A control valve 35 has its stem guided in the bore 32 and an armature 36 working in the bore 31 and its pointed end engages the valve seat member 26 and controls the flow of fuel through the passage 27.

In addition to the fuel pressure acting on the valve a spring 37, interposed between the lower end of the member 28 and a stop 38 formed by a cotter pin, is preferably provided to normally urge the valve to its seat.

The length of the casing member 28, or this length together with the number and thickness of the shims 29, determines the distance of the upper face of the armature from the pole face and hence the maximum lift of the valve. While the member 28 may be used alone it is preferred to use the shims in connection therewith so that if the valve or its seat wears, thus decreasing the actual or effective length of the valve, one or more of the shims may be removed to bring about the desired relationship for maximum lift. In the present instance the top surface of the armature is shown as a short distance below the top of the casing member 28 which alines with the pole face.

With this construction, when the coil 16 is energized the armature is attracted to the poles which it bridges as the lines of force flow across the air-gap therebetween and the valve is lifted off its seat against the action of the spring 37. When the valve lifts off its seat fuel passing through the bores 10, 11, 31, passage 33 and space 34 issues through the nozzle passage 27 into the engine cylinder 39 in which the conical end 21 of the member 19 is mounted and to which it is clamped by the studs 40 and nuts 41 associated with the plate 20.

Where the engine is of the multi-cylinder type, it is highly desirable to have all the valves lift the same amount so as to provide for an equal supply of fuel to all the cylinders and for this purpose I have provided a stop adjustable to limit the lift of the valve.

In its preferred form this stop consists of a rod 42, shown in Fig. 1, which is slidably mounted in the bores 10 and 11 and in a guide block 43 mounted in the core and provided with fuel passages 44, the lower end of this rod having flattened sides to provide fuel passages 45 establishing communication between the bores 10 and 31, said end projecting beyond the pole face and engageable with a block or pin 46 of non-magnetic material such as brass, bronze or tungsten inset in the armature 36, said end being bevelled so as to increase the effective pole face area where the rod 42 is of magnetic material and the effective area of the armature surface is also increased by the use of a small pin 46 though the rod or its lower end may be of non-magnetic material. This rod is preferably adjustable from outside the core or the pipe connections associated therewith and for this purpose in Fig. 1 I have provided an extension 47 of the core having a bore forming a chamber 48 therein alined with the bore 10, an annular shoulder 49, a threaded bore 50, and a fuel supply pipe passage 51. A flexible metal diaphragm 52, such as a single flexible metal plate or a number of laminations, seats on the shoulder 49 and is clamped in position over the open end of the bore 48 by a nut 54 in threaded engagement with the threaded bore 50. The upper end of the rod 42 is held against the central part of the diaphragm by a spring 55 interposed between the block 43 and a stop collar 56 on said rod. Thus the spring 55 holds the rod for movement by the flexing of the central portion of the diaphragm and this is accomplished by a cap-nut 57 having an adjustable threaded connection at 58 with the exterior of said extension, with a projection 59 working through an opening 60 in the nut 54 and engaging the outer side of the central portion of the diaphragm whereby turning of said nut serves to depress the central portion of the diaphragm and hence project the lower end of the rod the desired distance beyond the pole face so as to limit the lifting movement of the valve. The nut 57 and the extension may be provided with a micrometric scale and for this purpose the outer face of the nut has subdividing lines 61 thereon, reading in thousandths, cooperating with an index line 62 on the extension. With this construction the nut 57 is turned to depress the diaphragm until the lower end of the stop rod 42 engages the block or pin 46 of the valve which is either then in closed position or is moved to closed position by said rod and the position of the line 62 relative to the division lines 61 is noted. Then the nut 57 is turned back so as to bring the stop rod a predetermined distance above the armature, as shown by the micrometer scale reading and the nut is then locked against accidental turning by a screw 63 carried thereby and movable into engagement with the nut 54.

Figure 3:
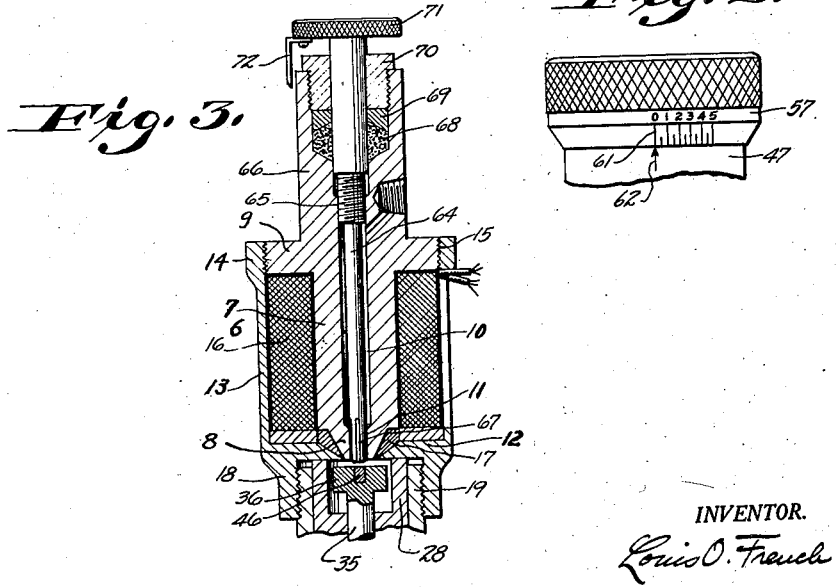
Fig. 3 is a detail vertical sectional view of a modified form of the device, parts being broken away.
Figure 2:
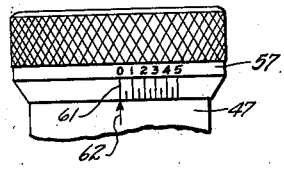
Fig. 2 is a detail elevation view of a part of the device.

In the modification shown in Fig. 3 the stop-rod 64 extends through the bores 10 and 11 and has a threaded portion 65 engaging a threaded bore in an extension 66 of the core of the magnet. The lower end of this stop member is provided with grooves 67 for the passage of fuel. The upper end of the stop member 64 works through a stuffing-box including a packing 68, follower 69 and gland-nut 70, and has a hand-wheel 71 mounted thereon to which an index pointer 72 is secured cooperating with a scale similar to that shown on the cap member of Figs. 1 and 2.

With this construction as the rod 64 is rotated by turning the handle or knob 71 in the proper direction it moves closer to the face of the armature and in this manner the height of the stop above the armature, when the valve is closed, may be readily determined by the extent of movement of the rod.

Since the other parts of the magnet and the valve structure are the same as those previously described further description thereof is deemed unnecessary.

It will be understood that the extension 47, shown in Fig. 1, of the extension 66 shown in Fig. 3, may be formed as a separate piece secured to the core and if so made may be of non-magnetic material, such as brass or bronze. Furthermore, the exterior adjusting means, in addition to being manually-operated, may be connected in any suitable manner for operation by the governor of the engine, if desired.

I desire it to be understood that this invention is not to be limited to any particular form or arrangement of parts except as such limitations are specified in the claims.

What I claim as my invention is:

1. In an electromagnetic valve, the combination of an electromagnet including a pole member provided with a bore, a valve casing associated with said magnet, a valve working in said casing and having an armature cooperating with said magnet, and an adjustable stop disposed in said bore and projecting beyond the pole face of said member to engage said armature to limit the lift of said valve.

2. In an electromagnetic valve, the combination of an electromagnet including a pole member provided with a bore, a valve casing associated with said magnet, a valve working in said casing and having an armature cooperating with said magnet, an adjustable stop disposed in said bore and projecting beyond the pole face of said member to limit the lift of said valve, and means for adjusting the position of said stop operable from outside of said magnet.

3. In an electromagnetic valve, the combination of an electromagnet including a pole member provided with a bore, a valve casing associated with the pole face of the magnet, a valve working in said casing and having an armature cooperating with said magnet, said armature having a non-magnetic central portion of small area, and an adjustable stop disposed in said bore and having a rod of magnetic material slidably mounted therein and projecting beyond the pole face of said member to engage said non-magnetic central portion of said armature to limit the lift of said valve.

4. In an electromagnetic valve, the combination of an electromagnet having a passage therein, a valve casing associated with said magnet, a valve working in said casing and having an armature cooperating with said magnet, an adjustable stop rod extending through said passage and engageable with said armature to limit the lift of said valve, a diaphragm associated with said rod, and means exterior of said passage for moving said diaphragm to adjust the position of said rod.

5. In an electromagnetic valve, the combination of an electromagnet having a passage therein, a valve casing associated with the magnet, a valve working in said casing and having an armature cooperating with said magnet, an adjustable stop rod extending through said passage and engageable with said armature to limit the lift of said valve, a diaphragm associated with said rod, and micrometrically adjustable means exterior of said passage for flexing said diaphragm to adjust the position of said rod.

6. In an electromagnetic valve, the combination of an electromagnet including a pole member provided with a bore, a valve casing associated with said magnet, a valve working in said casing and having an armature cooperating with said magnet, an adjustable stop disposed in said bore and projecting beyond the pole face of said member to engage a cooperative stop on said armature, one of said stops being of non-magnetic material.

7. In an electromagnetic valve, the combination of an ironclad electromagnet having a pole at one end, a valve having an armature cooperating with said pole, a casing member in which the armature is mounted and in which said valve is guided, a clamping member detachably secured to said pole and provided with an annular shoulder for clamping said casing member in sealing engagement with said pole at one end and with said clamping member at its other end, said clamping member having a bore extending from said casing member and having an opening controlled by said valve.

In testimony whereof, I affix my signature.

LOUIS O. FRENCH.